J. E. WILCOXEN.
MOLDING APPARATUS.
APPLICATION FILED AUG. 17, 1912.
1,059,250.
Patented Apr. 15, 1913.
2 SHEETS—SHEET 1.
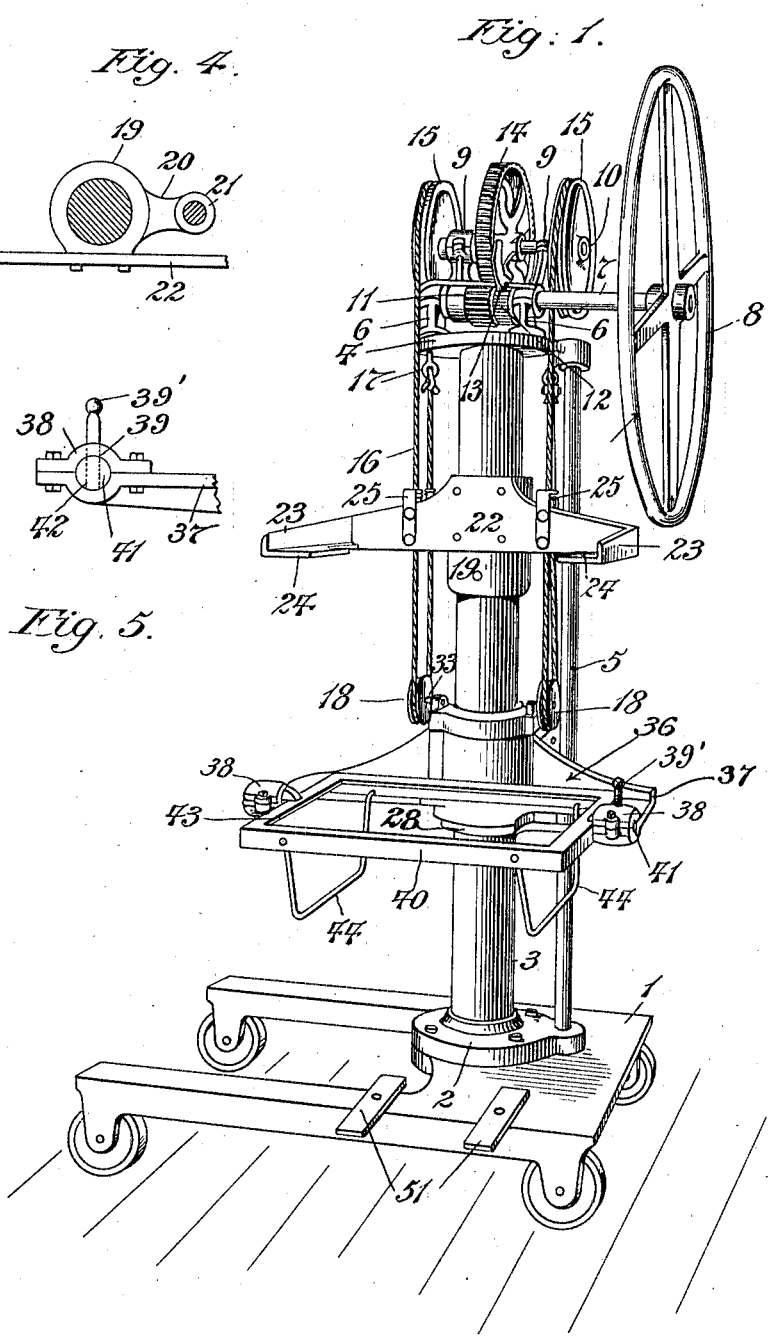
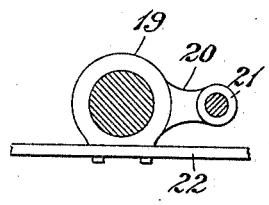
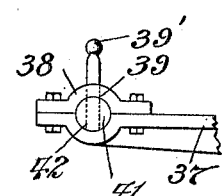
Witnesses:
Inventor
John E. Wilcoxen
By his Attorneys J. E. WILCOXEN.
MOLDING APPARATUS.
APPLICATION FILED AUG. 17, 1912.
1,059,250.
Patented Apr. 15, 1913.
2 SHEETS—SHEET 2.
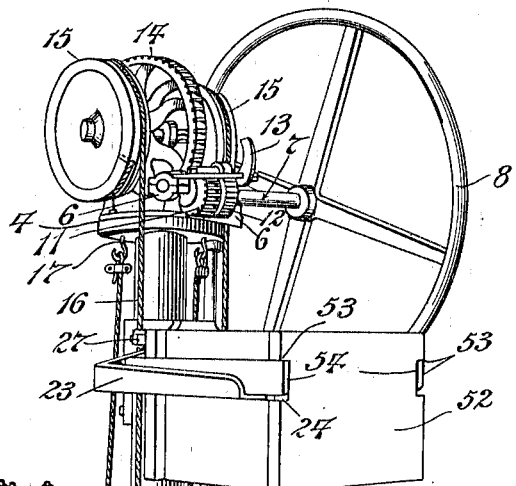
Fig. 2.
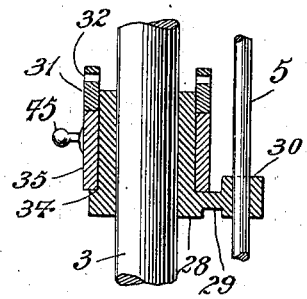
Fig. 3.
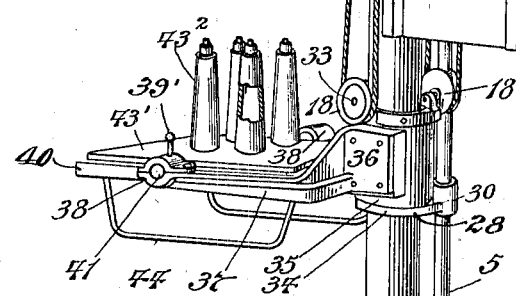
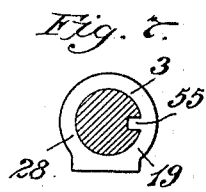
Fig. 7.
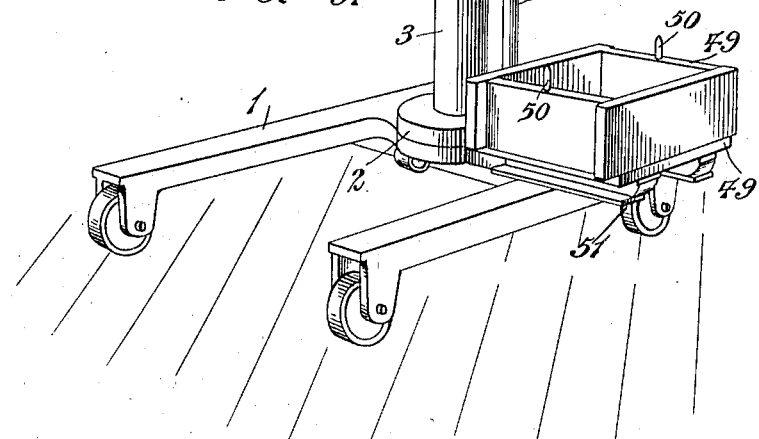
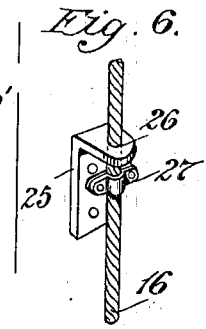
Fig. 6.
Fig. 8.
Witnesses:
Edward Rowland
Charles D. Edward
John E. Wilcoxen
Inventor
Stewart & Stewart
By his Attorneys

UNITED STATES PATENT OFFICE.

JOHN E. WILCOXEN, OF SOUTH BEND, INDIANA, ASSIGNOR TO THE STUDEBAKER CORPORATION, OF SOUTH BEND, INDIANA, A CORPORATION OF NEW JERSEY.

MOLDING APPARATUS.

1,059,250.  Specification of Letters Patent.  Patented Apr. 15, 1913.

Application filed August 17, 1912. Serial No. 715,595.

*To all whom it may concern:*

Be it known that I, JOHN E. WILCOXEN, citizen of the United States of America, residing at South Bend, in the county of St. Joseph and State of Indiana, have invented certain new and useful Improvements in Molding Apparatus, of which the following is a specification.

My invention relates to an improvement in molding devices, and particularly relates to apparatus for handling mechanically a two-part mold or flask in conjunction with a pattern, an impression from which is to be made in the mold.

The object of my present invention is to provide means by which these parts may be handled rapidly, conveniently and with precision.

I am aware that it is not new to mechanically assemble a two-part mold with a pattern and I do not intend to make such claim, but the invention which I herewith disclose offers many advantages which will be appreciated by those familiar with the art, in that through its operation essential movements are minimized and the parts are assembled, disassociated and again assembled with rapidity and precision, all of which results in economy of labor and accuracy of workmanship.

In the molding art one of the difficult problems is that of separating the two parts of the flask, the cope and drag after the sand is tamped about the pattern, removing the pattern without injuring the impression in the sand and again bringing the parts together with accuracy and precision and without jar or strain which might injure or destroy the delicate impressions in the sand. This apparatus is particularly designed to accomplish this result, at the same time reducing the labor expended to a minimum.

The machine which I here describe as one embodiment of my invention consists of a substantially vertical column or support on which a cope carrier is mounted to move in a fixed path preferably parallel with the axis of the column or support, also a pattern and drag carrier is mounted on the same column to move in the same path or direction, and to swing into and out of said path and in conjunction with the cope carrier and the drag and pattern carrier and the support, I provide suitable means shown in its preferred form as a rope and pulleys for moving and controlling the motion of the carriers along the fixed path described, so that when the cope and drag are brought together or separated, or when the pattern is withdrawn the alinement is maintained and the movements are all without shock or jar, so that the danger of displacing the sand and injuring the mold is minimized.

In the preferred form of my invention the cope and pattern are moved simultaneously in drawing the pattern, the cope carrier moving at the higher speed so that as the pattern is withdrawn from the drag, the cope is lifted from the pattern and drawing from both mold sections takes place at the same time.

The fact that the pattern and drag carrier can be rotated or swung laterally about the support enables the operator to withdraw it from beneath the cope carrier and move it to a convenient station to fill and tamp the drag. This carrier is provided with a pivoted frame which swings about a horizontal axis and the pattern plate is mounted on this frame, therefore, the operator can rotate the pattern plate and place the drag thereon, and having packed the drag with sand close the same with a bottom board and lock the board to the drag and the drag to the carrier with bales similar to those usually provided for this purpose. He can then rotate the pattern frame and drag about its horizontal axis until the drag occupies its normal position beneath the pattern plate and swing the pattern and drag carrier about the upright support until it reaches its position in alinement with or in the path of the cope where it is preferably locked against further lateral movement. Its movement is thus limited to the path of the cope which I have described.

The mechanism controlling the vertical movement of the carriers is now operated to lower the cope onto the drag and the drag onto a seat at the base of the column. The cope is then packed and tamped, the bales binding the drag to its carrier are released and the mechanism of the carriers is reversed to raise the carriers. This movement, it will be understood is in a straight line, that is to say, along a fixed path in which the cope carrier and the pattern and drag carrier are limited to move. Hence the movements which result in the separation of the cope and the drag and the withdrawal of the pattern all take place along this path, i. e., in a straight line. The drag being released rests on its seat while the cope carrier and pattern and drag carrier move upward, preferably starting together and the cope moving at the greater speed so that the cope rises to a position where it is clear of the extensions of the pattern, and the pattern and drag carrier having risen in like manner so the pattern is clear of the drag and is swung laterally out of the path of the cope. The lock, if a lock is used being suitably operated to provide for such swing. The cope is then lowered moving in the same fixed path in the same way as before, and being, as stated, in alinement with the drag which has remained in a fixed position since the drawing of the pattern, these two parts of the flask are again brought together with absolute precision so that the impressions made in the sand register and a complete mold is formed and assembled. The flask is now locked and removed.

The movements above described should be accomplished without shock or jar lest the sand in the cope and drag is disturbed, hence the mechanism for moving these parts is designed with that result in view.

In the accompanying drawings, I have illustrated the preferred form in which my invention has been embodied, designating the parts by numerals and referring to like parts by like numerals.

Figure 1 is a perspective view of the front of the machine, the flask and pattern being removed. Fig. 2 is a perspective of the machine taken from the left side, the pattern and drag carrier being swung out of the path of the cope carrier. Fig. 3 is a vertical, central section through the pattern carrier bearing. Fig. 4 is a horizontal section through the cope carrier bearing. Fig. 5 is a detail of the end of one of the pattern carrier arms showing the locking pin. Fig. 6 is a detail of a lug mounted on the cope carrier to engage the lifting band or rope. Fig. 7 shows an alternative type of guide for the cope and pattern support carrier. Fig. 8 is a detail section showing a device for locking the pattern carrier against lateral movement.

In the drawing I have shown a carriage 1 upon which the machine may be mounted for convenience in moving it from place to place. On this carriage is an upright shaft or support 3 having a base plate 2 secured to the carriage. A plate 4 is mounted on top of the shaft and a vertical guide rod 5, preferably parallel with the axis of the shaft 3, extends from the bottom to the top plate and has its ends seated in the plates 2 and 4. The plate 4 is provided with brackets 6—6 carrying the shaft 7 to which is secured the hand wheel 8; brackets 9—9, also mounted on the plate 4, carry a shaft 10 on which is a gear 14 which meshes with a pinion 11 on the shaft 7, so that the shaft 10 is conveniently driven by means of the hand wheel. Mounted on the shaft 10 are pulleys 15—15 secured to each of which at one end are flexible cords 16, which pass around the pulleys 15 and from there extend downward and around the pulleys 18 on the pattern and drag carrying sleeve 28 hereinafter described. From the pulleys 18 the ropes extend upward to the top plate 4 to which they are secured at 17. The ropes and coöperating gear serve to move the carriers. The motion of the carriers is checked at the will of the operator by means of a pawl 13, which engages a ratchet 12 on the hand wheel shaft 7. By this means rotation of the shaft is arrested.

Mounted on the shaft 3 and adapted to slide thereon substantially parallel to the axis thereof is a sleeve 19 having an arm 20 extending outward therefrom. This arm is provided at its end with a sleeve 21 which encircles the guide rod 5 and slides thereon. The cope carrier 22 is secured to the sleeve 19. It consists of a frame having parallel arms 23—23 with horizontal flanges 24. Mounted on the cope carrier at convenient points are brackets 25. These are pierced at 26 or otherwise adapted to receive the ropes 16 and coöperating with the brackets 25 are lugs 27 secured to the ropes, the lugs 27 engaging the brackets 25 serve to move the cope up and down the shaft or support 3; the rod 5, with the sleeve 21, serving as a guide for the carrier preventing rotation on the shaft 3, and causing it to move in a fixed rectilinear path.

A sleeve 28 upon which the pattern and drag carrier is mounted is shown in section in Fig. 3. This sleeve is provided with a radial arm 29, at the end of which is the sleeve 30 which encircles the guide rod 5 and slides thereon, serving as a guide for the sleeve 28, which carries the drag and pattern carrier. The carrier when thus rigidly secured to the sleeve moves in a straight line coinciding with the path of the cope carrier. At the base of the sleeve 28 is a shoulder or annular bearing 34, and encircling the sleeve 28 resting on this annular bearing is a second sleeve 35. To this sleeve the pattern and drag carrier 36 is secured. As the sleeve 35 rotates on the sleeve 28, the pattern and drag carrier may be rotated relatively to the shaft or upright support 3, as hereinafter set forth. The collar 31 encircles the sleeve 28 and is secured thereto above the sleeve 35 serving to hold the latter in position. This collar is pierced with holes 32 to receive the shafts 33 carrying the pulleys 18. The drag and pattern carrier 36 consists of a frame having parallel arms 37—37, each of which is provided near its end with a journal bearing 38. A pattern frame 40 provided with journals 41 to engage the bearings 38 swings between the arms 37, the bearings 38 and the journals 41 being pierced at 39 and 42 respectively to receive a pin 39' which serves to lock the frame against rotation, when desired.

The frame 40 is provided with a seat 43 to receive the pattern plate 43' on which is mounted the mold 43². The frame 40 is also provided with bales 44—44.

In Fig. 8, I have shown a locking means by which the sleeve 35, and incidentally the pattern and drag carrier are locked to the sleeve 28 at will to prevent rotation of the carrier about the sleeve 28 and about the shaft. When thus locked its movement is limited to the path of the cope which is preferably a straight line approaching the vertical. This device consists of a bolt 45 with a helical spring 46. The sleeve 35 and the sleeve 28 are pierced with holes 47 and 48 to receive the bolts. These holes register and the bolt operates when the drag and pattern carrier is in alinement with the cope carrier, i. e., when it enters the fixed path of the cope carrier so that when the lock is in operation, the movement of the pattern and drag carrier is limited to the straight line which is the path of the cope carrier. I have shown a drag 49 resting on a drag support 51. This drag or flask part is provided with dowel pins 50 which coöperate with corresponding apertures in the cope. The latter is shown at 52 as supported on the cope carrier between the arms 23. The cope is slotted at 53 to receive bars 54 which rest on the flanges 24 of the arms 23 and serve to support the cope.

In Fig. 7 I have shown an alternate form of construction in which the sleeves 19 and 28 are provided with a key 55 to engage a slot in the upright shaft 3. By any such expedient, the guide rod 5 may be dispensed with, but the rod is the preferred device.

The operation of the machine is as follows: When the sleeve 35 to which the pattern and drag carrier 36 are secured is bolted to the sleeve 28, I may operate the hand wheel 8, and by so doing raise and lower the cope and pattern and drag carrier, both carriers moving in a fixed path as described. However, the cope will move upward twice as fast as the pattern and drag carrier for the reason that the lug 27 is secured to the moving part of the rope 16, which has the same speed as have the peripheries of the pulleys 15. While the drag and pattern carrier is operated by the said rope through the medium of the pulleys 18 about which the ropes are passed, one end of each rope being fixed. Hence, it will be understood that the motion communicated to the pattern and drag carrier is but half that of the cope carrier. By turning the wheel 8, I operate the pinion 11, the gear wheel 14, and hence the pulleys 15. Should I desire at any time to sustain the carriers in any particular position, I drop the pawl 13 into engagement with the ratchet wheel 12. On the frame 43 I mount a pattern plate bearing a pattern in the form of the casting which I desire to produce. I have shown a skein pattern but this is merely for purposes of illustration. To form a mold from this position of the parts, I first release the pattern and drag carrier so that it may revolve about the shaft 3. This is done by withdrawing the pin 45 from its seat in the socket 48 and holding it until the hole 47 is moved out of registration with the socket 48. I then rotate the pattern and drag carrier to a convenient position as that shown in Fig. 2 and remove the pin 39' so that the pattern frame 40 may be rotated on its journals 41, the core openings being turned up. The pin 39' may be then replaced to lock the pattern plate in this position. The drag 49 is then placed on the inverted plate and the drag and cores are filled with sand or other molding material and tamped. A bottom board is then placed on the drag and secured thereto by means of bales 44. I then rotate the pattern plate and hence the drag so that the latter is depending and correspondingly unlock and lock the journal by means of the pin 39'. I then swing the pattern and drag carrier about the shaft 3, the sleeve 35 rotating on the sleeve 28 until this carrier enters the path of the cope carrier and the pin 45 falls into the socket 48 locking the pattern and drag carrier against further lateral movement and limiting it to movement in the rectilineal path of the cope carrier. The shaft 7 is then rotated by means of the hand wheel 8 so as to lower the drag on to its seat 51, the pattern and drag carrier moving in the path of the cope. The cope carrier moves downward with the drag until the latter rests on its seat and I continue to lower the cope carrier until the cope rests on the pattern plate 43' inclosing the pattern; I then fill the cope with molding material and tamp it until thoroughly packed, then the hand wheel 8 is rotated lifting the cope and pattern, the former moving at the higher rate of speed so that the pattern is withdrawn from the cope and drag simultaneously. It will be understood that in this operation, the path of the moving parts is a fixed straight line, and the chance of lateral motion of any member which might result in injury to the print is entirely eliminated. When the cope is elevated sufficiently to clear the pattern and the latter is raised sufficiently to clear the drag, the pattern and drag carrier is unlocked by withdrawing the pin 45 and the carrier is rotated out of the path of the cope. The pawl 13, coöperating with the ratchet 12 may be employed at this stage to sustain the cope in position. The ratchet may now be released and by operation of the hand wheel, the cope may be carefully lowered onto the drag; the latter will move downward on the exact path by which it was withdrawn and must therefore necessarily be returned into exact registration with the drag, the dowel pins 50 in the latter entering the corresponding apertures in the cope, and the impressions in the molding material will register in like manner with absolute precision. The cope and drag may now be bound together in their usual way and removed for casting.

I have thus described specifically and in detail a single embodiment of my invention in order that its nature and operation may be clearly understood. However, the specific terms herein are used in their descriptive rather than in their limiting sense and the scope of the invention is defined in the claims.

What I claim is:

1. In a molding machine, in combination, an upright support and guide, a cope carrier mounted thereon to move in a predetermined fixed path which is straight and substantially vertical, a pattern and drag carrier also mounted on the support to move in the same path and to swing into and out of said path, and means for moving and controlling the motion of the carriers.

2. In a molding machine, in combination, an upright support and guide, a cope carrier mounted thereon to move in a predetermined substantially vertical path, a pattern and drag carrier also mounted on the support to move in the same path and to swing into and out of said path, means for locking the pattern and drag carrier to limit its motion to the said path and means for moving and controlling the motion of the carriers.

3. In a molding machine, in combination, an upright support and guide, a cope carrier mounted thereon to move in a predetermined fixed path which is straight and substantially vertical, a pattern and drag carrier also mounted on the support to move in the same path and to swing into and out of such path and means for moving and controlling the motion of the carriers, and causing the cope carrier to move at a rate of speed higher than that of the pattern and drag carrier.

4. In a molding machine, an upright support and guide, a cope carrier mounted thereon to move in a predetermined rectilineal path approaching the vertical, a pattern and drag carrier also mounted on such support to move in the same path and to be swung at will into and out of said path and means for locking the pattern and drag carrier so that its motion is limited to the path of the cope and means for moving the carriers on the fixed path described.

5. In a molding apparatus, a vertical support, a cope carrier mounted to move in a fixed path parallel to the axis of said support, a pattern and drag carrier also mounted on said support to move in the same path and to swing about the support into and out of said path, means to move the carriers parallel with the support, said pattern and drag carrier being provided with means to support the pattern and drag, such means mounted to rotate about a substantially horizontal axis.

6. In a molding apparatus, a substantially vertical support, a cope carrier mounted to move in a path substantially parallel with the axis of said support, a pattern and drag carrier also mounted on said support to move in the same path and to swing about the support into and out of said path with means to move the carrier along the path described and means for locking the pattern and drag carrier to check its lateral movement and limit its traverse to the path of the cope carrier.

7. In a molding apparatus, an upright support, a cope carrier mounted thereon to move in a fixed path substantially parallel with the axis of the said support, a pattern and drag carrier also mounted on said support to move in the path of the cope carrier and to rotate about the support into and out of said path, means to move the carriers along said path at a predetermined relative speed, said pattern and drag carrier being provided with means to support the pattern and drag, such means journaled to rotate about a substantially horizontal axis and means to limit the movement of the pattern and drag carrier to the same fixed path as that to which the cope carrier is limited.

8. In a molding apparatus, a substantially vertical support, a cope carrier mounted thereon to move in a fixed rectilinear path in the general direction of the axis of the said support, a pattern and drag carrier also mounted on said support to move in the same fixed path and to rotate about the support into and out of said path, a flexible belt secured at one end to a point near the top of said vertical support and a driven member to which the other end is connected, said member being adjacent the top of said support, the belt being suspended to form a loop, a pulley secured to the pattern and drag carrier engaging the loop of said belt and means connecting the moving part of said belt to the cope carrier.

9. In a molding machine, in combination, an upright member or support, a cope carrier mounted thereon to slide up and down, a pattern carrier also mounted on the support to slide vertically and swing laterally, a pulley at the upper end of the support, a flexible member secured to the pulley and passing over the same, a pulley connected to the pattern carrier, the flexible member passing under this pulley and upward to a point near the head of the upright support where it is made fast, a member on the cope carrier through which the flexible member passes and a stop secured to the flexible member to engage the said member from beneath and lift the cope carrier, and means for rotating the pulley on the support.

10. In a molding machine, means supporting a drag, a pattern carrier and a cope carrier mounted to move toward and from the drag, and means for moving the pattern carrier and for moving the cope carrier at a rate of speed higher than that of the pattern carrier.

11. In a molding machine, in combination, an upright column, a cope carrier mounted thereon to slide up and down and means for guiding the cope carrier in a fixed path, a drag and pattern carrier mounted on the column to slide up and down in the same path and to swing laterally about the column into and out of said path, and means for moving the carriers.

Signed by me at South Bend, county of St. Joseph, State of Indiana, this 29th day of July 1912.

JOHN E. WILCOXEN.

Witnesses:
　JOHN F. COTTER,
　AOLPH COLBERG.

---

Copies of this patent may be obtained for five cents each, by addressing the "Commissioner of Patents, Washington, D. C."